United States Patent Office 3,463,764
Patented Aug. 26, 1969

3,463,764
PROCESS FOR PREPARING COPOLYMERS
John Joseph Hopwood, Glen Waverley, Victoria, and David Jankiel Wluka, East St. Kilda, Victoria, Australia, assignors to Balm Paints Limited, Melbourne, Victoria, Australia, a company of Australia
No Drawing. Filed Oct. 4, 1966, Ser. No. 584,103
Claims priority, application Australia, Oct. 7, 1965, 65,010/65
Int. Cl. C08f *19/02*
U.S. Cl. 260—78.5                        20 Claims

ABSTRACT OF THE DISCLOSURE

A process which comprises copolymerizing at least one derivative of a mono-ethylenically unsaturated dicarboxylic compound with one or more copolymerizable ethylenically unsaturated co-mers, with which it has a strong tendency to yield alternating copolymers, characterized in that the copolymerization is carried out in solution in the presence of a dipolar aprotic solvent, thereby producing a homogeneous copolymer comprising a substantially lower proportion of co-mer I than obtained in the absence of said dipolar aprotic solvent.

---

This invention relates to a process for the manufacture of addition copolymers of ethylenically unsaturated compounds and mono-ethylenically unsaturated aliphatic carboxylic compounds. In particular it relates to processes for making such copolymers by free radical initiated polymerisation processes in proportions which are not favoured by their reactivity ratios.

The feasibility of copolymerising pairs of monomers and the feasible ranges of their molecular proportions have been described in the literature, e.g., Walling (Chapter 4 of "Free Radicals in Solution," John Wiley and Sons, Inc., New York, 1957). Thus, it is known that in many instances the reactivity ratios of ethylenically unsaturated monomers are such that relatively homogeneous copolymers can be formed over a wide ratio of co-mer proportions. In other instances, however, as in the copolymerisation of certain derivatives of mono-ethylenically unsaturated dicarboxylic acids e.g., maleic or fumaric acid with alkenyl aromatic compounds, e.g., styrene, there is a strong tendency towards the formation of alternating copolymers. By alternating copolymer is meant a copolymer in which the constituent monomers $M_1$ and $M_2$ are present in substantially equimolar proportions, and in which there is a high probability that any $M_1$ mer-unit will be followed by a $M_2$ mer-unit, and conversely, an $M_2$ unit will be followed by an $M_1$ unit, i.e., that the favoured molecular ratio of the monomers is 1:1. To explore to what extent deviation from this favoured ratio can be achieved, studies have been made of the copolymerisation of styrene with maleic anhydride using very large excesses of styrene. It has been found that up to a maximum of 2 moles of styrene per mole of maleic anhydride could be forced into the copolymer (Alfrey and Lavin, Journal of the American Chemical Society, vol. 67, page 2044, 1945). Other efforts to incorporate large proportions of styrene have been made, but these have employed procedures in which the resulting product is a mixture of alternating copolymers of styrene and maleic anhydride with styrene homopolymer. It is also known that these copolymerisations are highly exothermic and that the rate of reaction increases with increasing temperature. Hence, because of considerations of safety, the art has hesitated to use extremely high temperatures as a means of producing departure from the alternating copolymers. To overcome these difficulties it has been proposed in British Patent No. 890,113 to copolymerise styrene and maleic anhydride by simultaneous incremental feed at a molar ratio in excess of 1.2:1 at high temperatures in a solvent. This process still suffers from several disadvantages; operation at high temperatures is inconvenient, expensive and gives poorer process and product control; the copolymerisation is highly exothermic and control at higher temperatures is therefore more difficult; only small concentrations of monomer in large excess of solvent can be used and high molecular weight material is more difficult to obtain.

We have now found that the difficulties associated with copolymerisation of those co-mers which normally tend to form alternating copolymers can be overcome if certain specified solvents are used as reaction media.

Accordingly we provide a process which comprises copolymerising at least one derivative I of a mono-ethylenically unsaturated dicarboxylic compound with one or more copolymerisable ethylenically unsaturated co-mers II, with which it has a strong tendency to yield alternating copolymers, characterized in that the copolymerisation is carried out in solution in the presence of a dipolar aprotic solvent, thereby producing a homogeneous copolymer comprising a substantially lower proportion of co-mer I than obtained in the absence of said dipolar aprotic solvent.

We also provide a process for the manufacture of copolymers which comprises copolymerizing a derivative I of a mono-ethylenically unsaturated dicarboxylic compound with an ethylenically unsaturated co-mer II, with which it has a strong tendency to yield an alternating copolymer, and forming a substantially homogeneous copolymer comprising at least 2 moles of said ethylenically unsaturated co-mer II per mole of said monoethylenically unsaturated dicarboxylic compound I characterised in that the polymerisation is carried out in solution in the presence of an inert dipolar aprotic solvent.

By derivative I of a mono-ethylenically unsaturated dicarboxylic compound we mean an unsaturated dicarboxylic acid, in anhydride, an acid ester or an acid amide of said unsaturated dicarboxylic acids excluding, however, fumaric acid itself.

Examples of acids and anhydrides are maleic acid, chloromaleic acid and citraconic acid and the corresponding anhydrides.

Examples of acid esters are ethyl hydrogen maleate, hexyl hydrogen maleate, octadecyl hydrogen maleate, cyclohexyl hydrogen maleate, benzyl hydrogen maleate, methyl hydrogen fumarate, butyl hydrogen fumarate, dodecyl hydrogen fumarate, cetyl hydrogen citraconate and nonyl hydrogen citraconate.

Examples of acid amides are N-hexyl maleamic acid and N-octyl citraconamic acid.

Preferred mono-ethylenically unsaturated dicarboxylic compounds are maleic acid, the anhydrides of maleic, chloromaleic and citraconic acids and the acid esters of maleic, fumaric, chloromaleic and citraconic acids. More highly preferred are maleic anhydride and the acid esters of maleic and fumaric acids. Most preferred is maleic anhydride.

Suitably ethylenically unsaturated co-mers II according to our invention are compounds of the formula

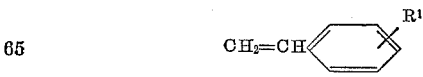

wherein $R^1$ is an alkyl group having 1 to 4 carbons, or halogen, such as styrene, m- and p-vinyl toluene, p-chlorostyrene and derivatives of the formulae: $CH_2=CHCOOR^2$ and $CH_2=CH.CONR^3R^4$ wherein $R^2$ is alkyl or alkyl substituted by an alkoxy or a poly(alkyleneoxy) group terminated by an alkyl, aryl, alkaryl, aralkyl or cycloalkyl group, $R^3$ and $R^4$ are alkyl or hydrogen. Examples are methyl acrylate, ethyl acrylate, butyl acrylate, isobutyl acrylate, n-hexyl acrylate and 2-ethoxy ethyl acrylate, the acrylate of the monoethyl ether of tetraethylene glycol, N,N-dimethylacrylamide, N-n-octylacrylamide and acrylamide. Styrene and m- or p-vinyl toluene are preferred.

By the term "inert" dipolar aprotic solvent we mean that said solvent does not chemically react with co-mers I and II or any other constituent of the system undergoing polymerisation. Suitable dipolar aprotic solvents are, for example, the solvents set out below in classes A, B, C, D, E, F and G.

Class A.—Carboxylic acid amides of the formula

wherein $R^5$ is hydrogen, alkyl, aryl, cycloalkyl, alkaryl, aralkyl, —$R^{10}$—$COOR^8$ or —$R^{10}$—$CONR^8R^9$; $R^6$, $R^7$, $R^8$ and $R^9$, which may be the same or different, are alkyl, cycloalkyl, aryl, alkaryl or aralkyl, and $R^6$ and $R^9$ may also be hydrogen, —$R^{10}$— is a bivalent radical arylene, alkylene, aralkylene or —$(CH_2)_m$—$O(CH_2)_p$— where $m$ and $p$ are integers.

Class B.—Cyclic lactams of the formula

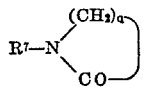

where $R^7$ is as above defined and $q$ is an integer from 3 to 7 inclusive.

Class C.—Stable acylated cyclic secondary amines of the formula

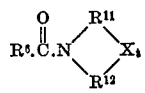

wherein $R^{11}$ and $R^{12}$ are alkylene bridges, X which may be absent ($t=0$) or present ($t=1$), stands for —O— or

$R^6$ and $R^9$ are as defined above, and wherein the ring may be 5, 6 or 7 membered.

Class D.—Substituted phosphoramides and phosphonamides of the formulae

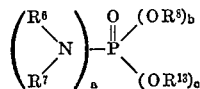

and

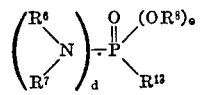

where $R^6$, $R^7$ and $R^8$ are as above defined and $R^{13}$ is defined as $R^8$ and, optionally, may be substituted with halogen or alkoxy groups and $a$ may be 1, 2 or 3; $b$ and $c$, which may be the same or different, stand for 2, 1 or 0 and $a+b+c=3$; $d$ may stand for 1 or 2 and $e=1$ or 0, $d+e=2$.

Class E. — Carbonic acid amides of the formula $R^6R^7N$—CO—Y where Y stands for —$OR^8$ or —$NR^8R^9$ and $R^6$, $R^7$, $R^8$ and $R^9$ are as above defined.

Class F.—Sulphoxides of the formula $R^{14}R^{15}SO$ where $R^{14}$ and $R^{15}$, which may be the same or different, are alkyl groups having 1 to 4 carbon atoms.

Class G.—The N-oxides of aromatic cyclic tertiary amines.

It will be apparent that substitution of the groups R which does not affect the inert aprotic dipolar nature of the solvent, e.g., halogenation, does not alter the efficacy of these solvents; hence derivatives so substituted are within the scope of the present invention. Preferred examples are, in Class A: dimethylformamide, N,N-dimethylacetamide, N,N-dimethylpropionamide, N,N-dimethylstearamide, N,N-dimethylbenzamide, N,N,N',N'-tetramethyladipamide; in Class B: N-methylpyrollidone, N-methylpiperidone, N-methyl-epsilon-caprolactam; in Class C: N-formyl-pyrollidine, N-acetyl-pyrollidine, N-formyl piperidine, N-acetyl piperidine, N-formyl morpholine, N-acetyl morpholine; the formyl derivatives are more preferred; in class D: hexamethylphosphoramide, N,N-dimethyl-O,O'-diethyl phosphoramidate, N,N,N',N'-tetramethyl chloromethylphosphonamide, tetramethyl phenylphosphonamide; in Class E: N,N-dimethyl ethyl carbamate and tetramethyl urea; in Class F: dimethyl sulphoxide; in Class G: pyridine-N-oxide.

Our process is not limited to binary copolymers; copolymers including two or more co-mers II are specifically included.

The concentration of the dipolar aprotic additive is not narrowly critical; the most potent additives, e.g., dimethylformamide, hexamethylphosphoramide, pyridine-N-oxide and N,N-dimethyl-O,O'-diethyl phosphoramidate are operative at extremely low concentrations, e.g., at 0.5% by weight of the total monomer weight; the upper limit is not narrowly critical and includes the region where the polar aprotic solvent is the reaction medium. In general, also for economical reasons, lower concentrations in the region from 1 to 20% are preferred, and most preferred is the range from 3 to 10%, all based on total weight of the monomers.

The co-mers may be added directly in the approximate proportions in which they are to be copolymerised; most conveniently they are added continuously at controlled proportions and at a rate convenient for maintenance of the desired temperature.

A major advance of our invention is that the co-mers can be conveniently copolymerised homogeneously at molar ratios of co-mer II to co-mer I in excess of 2:1, namely from 2 to 1 to 50 to 1, without the need for "skew feed" with complicated continuous recycle or extremely high operating temperatures. Very useful preferred molar ratios of co-mer II to co-mer I which are difficult or impossible to achieve with other means are ratios from 3:1 to 20:1, and particularly from 3:1 to 9:1.

The reaction conditions for the copolymerisation in the presence of our specified solvents are in accordance with the prior art. Thus temperatures from 40 to 140, preferably 60 to 120° C. are operative.

The polymerisation is carried out in solution in a suitable solvent. Solvents suitable for the polymerisation of pairs of co-mers are known from the prior art, e.g., xylene, cyclohexane, benzene, or other hydrocarbons, butyl acetate, methyl isobutyl ketone, 2-ethoxyethyl acetate or dioxan. The solvent should be nonaqueous, preferably also nonprotic. As already stated the dipolar aprotic solvents themselves may be the reaction medium, i.e., the main or even the sole solvent.

Suitable initiators, namely free radical catalysts such as organic peroxides or azo compounds, e.g., benzoyl peroxide or azobisisobutyronitrile, are also known from the prior art.

Our copolymers are particularly useful in preparing themosetting surface coating compositions. For example in the case of copolymers of maleic anhydride the anhydride groups along the chain are readily modified with plasticising side groups by reaction with fatty alcohols or poly-alkyleneoxy-mono-alcohols and the carboxyl groups formed simultaneously may then be reacted with polyepoxide resins to form a cross-linked thermoset polymeric composition which may be the basis of coating compositions. Similarly, copolymers of acid esters such as alkyl hydrogen maleates or fumarates may be made directly and cross-linked with epoxy resins. Alternatively, the copolymers containing anhydride groups may be reacted directly with epoxy resins. The ability to control and vary the proportions of dicarboxylic co-mers and their homogeneous distribution within a copolymeric composition offers great flexibility in the choice of desired combinations and leads to thermosetting coating compositions having superior mechanical and optical properties, and enhanced resistance to solvents, detergent solutions, salt spray and staining with mustard, lipstick or oleic acid-corn oil mixtures.

In another variation, copolymers of this invention containing free carboxy groups may be reacted with an alkylene oxide, e.g., propylene oxide, and the modified polymers produced may then be cross-linked with formaldehyde condensates of nitrogen resins. The thermoset coatings based on these compositions also have the superior properties described for the compositions cross-linked with epoxy resins.

Styrene-modified alkyds can be synthesised by inverting the usual procedure by reacting low molecular weight nonalternating copolymers of styrene and maleic anhydride with polyols and fatty acids in processes well known to those skilled in the art. Compositions made with highly unsaturated fatty acids are air-drying. Compared with the normal process for making styrene-modified alkyds, the invert process allows better control of the incorporation of the styrene monomer.

Our invention is illustrated by, but not limited to, the examples set out below.

Example 1 demonstrates the conventional process of the copolymerisation of a representative co-mer I (i.e., maleic anhydride) and a representative co-mer II (i.e., styrene). Because of the strong alternating tendency of maleic anhydride and styrene, the product made by the process of Example 1 and representative of the prior art, consisted essentially of the alternating copolymer of styrene with maleic anhydride admixed with the homopolymer of styrene.

By contrast, in the process of this invention, as demonstrated in Example 2 for the copolymerisation of maleic anhydride with styrene in the presence of dimethylformamide, a dipolar aprotic solvent, the tendency to alternate was largely suppressed, and the product consisted of a homogeneous copolymer of the two co-mers essentially in the molar proportions in which the co-mers were supplied to the copolymerisation reaction.

The differences between the products formed in Examples 1 and 2 respectively were shown by separately reacting the products with a cross-linking agent to form a cured film, and comparing the properties of the two films. In this test, a solution of the polymeric product was mixed with "Epon 828" (registered trademark, Shell Chemical Co., an aromatic epoxy resin) and a thin film of the mixture was cast on a flat glass plate or steel panel; cross-linking was then effected by heating the glass plate or steel panel at about 150° C. for 0.5 hour. Where the maleic anhydride (co-mer I) was randomly distributed through the polymeric product, as in Example 2, complete and uniform cross-linking was achieved. However, in Example 1, the heterogeneity of the polymeric product was betrayed by the presence of substantial amounts of uncross-linked polystyrene, i.e., the uncross-linked homopolymer of co-mer II. This led to a film that was cloudy, hazy, low in gloss, soft, and sensitive to solvents, especially those in which polystyrene is soluble. Sensitivity to xylene, which is a solvent for polystyrene, was determined by rubbing the cured film for 2 minutes with a soft tissue paper soaked in xylene, taking care to ensure that pressure, temperature and technique were the same for all tests. Thus, heterogeneity of the polymeric product was conveniently measured by the sensitivity of the cross-linked film to xylene. The characteristics of the cross-linked films, apart from giving a good indication of the heterogeneity of the product of the copolymerisation are also an indication of practical utility in that resistance to solvents, gloss, transparency and hardness of the cross-linked film are all practical requirements for surface coatings prepared from the copolymers. The test therefore also confirms practicability.

The properties of cross-linked films, as described above for Examples 1 and 2, were also the basis for assessing the products made as described in Examples 3 to 13 inclusive and Examples 33 to 67 inclusive. The resistance to xylene as described above was a more severe and telling test for the cross-linked film than the observation of its appearance (i.e., transparency, gloss) or hardness and in Table II, for Examples 33 to 67 incl. only the resistance to xylene is recorded, and the response to the test was rated according to the following scale.

A *rating of "0"* means that the film was attacked badly on contact and dissolved completely in less than 2 minutes.

A *rating of "1"* means that the film was swollen or attacked by the treatment with xylene and at least partly disappeared when rubbed with said tissue paper for 2 minutes.

A *rating of "2"* means that the film was swollen by the treatment with xylene but did not appear to dissolve in the solvent.

A *rating of "3"* means that the area of film treated with xylene turned cloudy, but did not become sticky or otherwise affected by the solvent.

A *rating of "4"* means that the cured film was quite unaffected even after being rubbed for 2 minutes.

In Examples 14 to 30, as detailed in Table I, the copolymerisations were allowed to proceed for only ¼ to 1.5 hours, when the polymeric product was isolated, dried and analysed for co-mer I by titration with sodium methoxide in nonaqueous medium. The tendency to form alternating copolymers when conventional processes were used was reflected in the contents of co-mer I obtained in the control experiments which were higher than when the dipolar aprotic solvents of this invention were used. Thus, e.g., the results of Examples 14 and 15 as set out in Table I may be compared. The differences are greater than is apparent from comparing the levels of n-butyl acid maleate in the polymers made by the described procedure since, if the control (i.e., Example 15) had been stopped when the conversion was only 22%, the same as for Example 14, then the level of n-butyl acid maleate in the polymeric product would have been markedly higher than 35 mole percent.

EXAMPLE 1

This example demonstrates the conventional process of copolymerisation.

200 parts of xylene and 50 parts of acetone in a glass reaction vessel were stirred and heated under reflux. A solution of 0.8 part of azobisisobutyronitrile in 200 parts of styrene was added to the refluxing solvent at a uniform rate over two hours. Starting at the same time as the above addition, a solution of 0.25 part of benzoyl peroxide and 50 parts of maleic anhydride in 100 parts of xylene warmed and maintained at 35–40° C. was also added to the refluxing solvent at a uniform rate over three hours. During the experiment resinous material deposited on the walls of the reaction vessel. This mixture was heated under reflux for a further two hours and then 73.5 parts of "Nonanol" (registered trademark, Imperial Chemical Industries Ltd. for 3,5,5-trimethylhexanol containing approximately 5% of isomeric alcohols) were charged to the reaction vessel, and the condenser was set for distillation. Solvent was distilled from the reaction vessel until the temperature of the remaining liquid rose to 140° C. when heating under reflux was resumed and continued for four hours.

A representative sample of 20 parts of solution containing 50% solids was mixed with 2.3 parts of "Epon 828" (registered trademark, Shell Chemical Co., an epoxy resin). A film of this mixture of about 0.010 inch wet thickness was cast on glass, and then placed in an oven at 147° C. for 0.5 hour. The cured film was soft, cloudy, xylene-sensitive and low in gloss.

EXAMPLE 2

This example demonstrates the present invention.

To 200 parts of boiling xylene and 50 parts of acetone, contained in a glass reaction vessel equipped with heating mantle, stirrer and reflux condenser were added 200 parts of styrene and 0.8 part of azobisisobutyronitrile over two hours. Starting at the same time a mixture of 100 parts of xylene, 0.25 part of benzoyl peroxide, 50 parts of maleic anhydride, and 10 parts of dimethylformamide was added at a uniform rate over three hours. A copolymer of the approximate molar composition 80/20 styrene/maleic anhydride was thereby obtained. This copolymer was converted to the "Nonanol" half ester by adding one mole equivalent of "Nonanol" per mole of anhydride, stripping off acetone, raising the temperature to 140° C. and holding at that temperature for four hours until the reaction between the anhydride and the alcohol was completed. Viscosity increased during the conversion to a constant level. The solution remained clear and homogeneous on standing.

To 20 g. of this solution containing 50% solids there was added 2.3 g. of "Epon 828" and this mixture was cast on glass and stoved for ½ hour at 300° F. as described in Example 1. The film was found to be clear, glossy, hard and xylene-resistant.

EXAMPLE 3

410 parts of xylene in a glass reaction vessel were stirred and heated under reflux. 408 parts of styrene were added to the refluxing solvent at a uniform rate over two hours. At the same time, a solution of 3 parts of benzoyl peroxide, 5 parts of tertiary-butyl hydroperoxide, 98 parts of maleic anhydride in a mixture of 20 parts of dimethylformamide and 200 parts of xylene was added to the reactor at a uniform rate over 3 hours. This mixture was refluxed for a further two hours, cooled to 120° C. and 144 parts of "Nonanol" charged into the reaction mixture which was then heated a further 4 hours at 120° C.

A sample of the polymer solution was again reacted with "Epon 828" as described in Example 1, and the cured film made was clear, glossy, hard and xylene-resistant.

EXAMPLE 4

410 parts of xylene, 100 parts of "Nonanol" and 84 parts of cetyl alcohol in a glass reaction vessel were stirred and heated under reflux. A mixture of 204 parts of styrene and 204 parts of ethyl acrylate was added to the refluxing solvent at a uniform rate over two hours. Starting at the same time as the above addition, a solution of 3.0 parts of benzoyl peroxide, 5.0 parts of tertiary-butyl hydroperoxide and 98 parts of maleic anhydride in a mixture of 20 parts of dimethylformamide and 200 parts of xylene was added to the refluxing solvent at a uniform rate over three hours. This mixture was then refluxed a further three hours. A sample of this polymer solution was reacted with "Epon 828" to give a film on glass as in Example 1. The film was clear, xylene-resistant, glossy and hard.

EXAMPLE 5

308 parts of styrene, 100 parts of ethyl acrylate, 98 parts of maleic anhydride and 150 parts of "Nonanol" were reacted together as in Example 4. A sample of this polymer solution was treated with "Epon 828" to give a film on glass as in Example 1. The film was clear, xylene-resistant, glossy and hard.

EXAMPLE 6

482 parts of vinyl toluene (a mixture of 60% meta-vinyl toluene and 40% para-vinyl toluene), 98 parts of maleic anhydride and 150 parts of "Nonanol" were reacted as described in Example 4. A sample of this polymer solution was reacted with "Epon 828" to give a film on glass as in Example 1. The film was clear, xylene-resistant, glossy and hard.

EXAMPLE 7

359 parts of styrene, 150 parts of "Nonanol," 126 parts of cetyl alcohol, 147 parts of maleic anhydride and 30 parts of dimethylformamide were reacted as in Example 4. A sample of this polymer solution was reacted with "Epon 828" to give a film on glass as in Example 1. The film was clear, glossy, xylene-resistant and hard.

EXAMPLE 8

408 parts of styrene, 98 parts of maleic anhydride, 100 parts of "Nonanol" and 84 parts of cetyl alcohol were reacted by the procedure of Example 4. A sample of this polymer solution was formulated into an appliance enamel as follows:

| Component— | Parts by weight |
|---|---|
| Rutile titanium dioxide | 26.0 |
| Copolymer solution of this example (51% solids) | 52.0 |
| "Epon 828" | 5.0 |
| Xylene | 8.5 |
| n-Butanol | 2.0 |
| Silicone solution (1% "Dow Corning 200") | 0.002 |

The titanium dioxide was admixed with seven parts of the copolymer solution and the mixture ground in a porcelain ball mill containing porcelain balls. The remaining copolymer solution and the other components were added and the mixture blended to yield a paint having a viscosity of 32 seconds in a Ford No. 4 viscosity cup. The formulation was then reduced to a spraying viscosity of 21 seconds in a Ford No. 4 viscosity cup by the addition of xylene. The resulting coating composition had a total solids content of approximately 50 percent.

The enamel thus prepared was sprayed onto both primed and unprimed steel panels at a film thickness of 0.0018" and cured for 30 minutes at 147° C. The films had the following properties, the ratings being compared with a typical marketed thermosetting acrylic appliance enamel.

| | |
|---|---|
| Gloss (60° head) | Greater than 92 rating. |
| Hardness (Tukon Tester) | 20 Knoop. |
| Mar resistance | Excellent, superior. |
| Adhesion to "Granodine" treated steel (a zinc phosphating process, "Granodine" is a registered trademark of Balm Paints Limited) | Excellent, equal. |
| 500 hours salt spray exposure (unprimed) | Excellent, superior. |
| 500 hours salt spray exposure (primed) | Do. |
| 100 hours detergent immersion (unprimed) | Do. |
| 500 hours detergent immersion (primed) | Do. |
| 200 hours exposure to mustard stain | No stain, equal. |
| 200 hours exposure to lipstick | Do. |
| 200 hours exposure to oleic acid/corn oil | No stain, superior. |
| Xylene/butyl acetate resistance | Excellent, superior. |

EXAMPLE 9

204 parts of styrene, 259 parts butyl acrylate, 150 parts of "Nonanol' and 98 parts of maleic anhydride were reacted as in Example 4. A sample of this polymer solution was reacted with "Epon 828" to give a film on glass as in Example 1. The film was clear, xylene-resistant, glossy and hard.

EXAMPLE 10

The process of Example 3 was repeated except that 80 parts of dimethylformamide were used. The cured film produced was clear, glossy, hard and xylene-resistant.

EXAMPLE 11

420 parts of xylene in a glass reaction vessel were stirred and heated under reflux. 408 parts of styrene were added to the refluxing solvent at a uniform rate over three two hours. At the same time as the above addition, a solution of 3.0 parts of benzoyl peroxide and 5.0 parts of tertiary-butyl hydroperoxide in a reaction mixture preformed by heating 200 parts of "Nonanol," 98 parts of maleic anhydride, 20 parts of dimethylformamide and 200 parts of xylene together at 130° C. for 0.75 hour was added to the refluxing solvent at a uniform rate over three hours. This mixture was then refluxed a further three hours. A sample of this polymer solution was cross-linked with "Epon 828" to give a film on glass as in Example 1. The film was clear, xylene-resistant, glossy and hard.

EXAMPLE 12

200 parts of xylene in a glass reaction vessel were stirred and heated under reflux. A mixture of 132 parts of styrene and 105 parts of octadecene-1 was added to the refluxing solvent at a uniform rate over two hours. Starting at the same time as the above addition, a solution of 1.3 parts of benzoyl peroxide, 2.1 parts of tertiary-butyl hydroperoxide and 41 parts of maleic anhydride in 12.5 parts of dimethylformamide and 83 parts of xylene was added to the refluxing solvent at a uniform rate over three hours. This mixture was refluxed for a further two hours, cooled to 120° C. and 61 parts of "Nonanol" added and the reaction mixture then heated a further 1.5 hours at 120° C. A sample of this polymer solution was treated with "Epon 828" to give a film on glass as in Example 1. The film was xylene-resistant and hard.

EXAMPLE 13

300 parts of xylene in a glass reaction vessel were stirred and heated under reflux. 422 parts of 2-ethoxyethyl acrylate were added to the refluxing solvent at a uniform rate over two hours. At the same time as the above addition, a solution of 2.2 parts of benzoylperoxide, 3.8 parts tertiary-butyl hydroperoxide and 70 parts of maleic anhydride in 30 parts of dimethylformamide and 216 parts of xylene was added to the refluxing solvent at a uniform rate over three hours. This mixture was heated under reflux for a further two hours, cooled to 100° C., 103 parts of "Nonanol" were added and the solution was held a further five hours at 100° C.

7 parts of the resulting polymer solution, 14 parts of the polymer solution described in Example 8 and 2 parts of "Epon 828" were mixed. A film of this mixture of about 0.010 inch wet thickness was cast on glass, and then cured in an oven at 147° C. for 0.5 hour. The film obtained was clear, xylene-resistant, glossy and hard.

EXAMPLE 14

A solution of 5.2 g. of styrene, 0.06 g. of azobisisobutyronitrile and 2.085 g. of n-butyl acid maleate in 6.8 g. of acetone and 10.2 g. of dimethylformamide was made up in a 50 ml. flask fitted with a reflux condenser. An atmosphere of nitrogen was established in the flask and maintained while the flask was heated for one hour in a water bath held at 80° C. The flask was then cooled and its contents poured slowly with vigorous stirring into 2 litres of dry methanol; the precipitated polymer was collected and dried to constant weight at 40° C. The polymer was further dried in vacuo over silica gel for 24 hours at 25° C. A weighed sample of the polymer was then dissolved in dry methyl ethyl ketone and titrated with a solution of sodium methoxide in dry methanol; the concentration of n-butyl acid maleate in the copolymer was calculated from the results of this titration and is recorded in Table I.

EXAMPLES 15–30 INCLUSIVE

Examples 15–30 were carried out with the quantities of reactants recorded in Table I in a manner otherwise identical with that of Example 14. In each of these examples 0.06 part of azobisisobutyronitrile were used. In Examples 18, 29 and 30 the solution of copolymer was poured into light petroleum (B.P. 60–80° C.) instead of methanol used in Example 14 to precipitate the product. The precipitate was dissolved in the minimum amount of acetone and again poured into a large excess of light petroleum (B.P. 60–80° C.).

Examination of the results in Table I shows that in the presence of dipolar aprotic solvents, the content of co-mer I in the copolymers made is lower than in the control experiments. Thus, the copolymer of Example 15 contained 35 mole percent of n-butyl acid maleate, whereas the copolymers of Examples 14 and 16 to 24 inclusive contained lower amounts as set out in Table I. It is known from the prior art that, had the experiment of Example 15 been stopped at an earlier stage, the polymer made would have been richer in n-butyl acid maleate than the 35 mole percent value given in Table I.

EXAMPLE 31

3.9 parts of styrene, 2.15 parts of n-butyl acid maleate, 1.25 parts of ethyl acrylate, 10.25 parts of dimethylformamide, 0.06 part of azobisisobutyronitrile and 6.75 parts of acetone were reacted for 1 hour and the polymer isolated and analysed as in Example 14. The yield of polymer was 25% (w./w.) of the total monomers used and the copolymer contained 12 mole percent of butyl acid maleate, as determined by titration with sodium methoxide in nonaqueous medium as in Example 14.

EXAMPLE 32

3.9 parts of styrene, 2.15 parts of n-butyl acid maleate, 1.25 parts of ethyl acrylate, 17.0 parts of methyl ethyl ketone and 0.06 part of azobisisobutyronitrile were reacted as in Example 14. Polymer yield was 24% of the total monomers used and the n-butyl acid maleate content of the copolymer made was 25 mole percent.

A comparison of Examples 31 and 32 shows that the copolymer made in the presence of the dipolar aprotic solvent has a lower content of n-butyl acid maleate than that made according to the prior art.

EXAMPLES 33 TO 67 INCLUSIVE

Three polymerisation processes A, B and C respectively as indicated in Table II were used to demonstrate the efficacy of various dipolar aprotic solvents in the copolymerisation of styrene with co-mers I. The results of the xylene rub test are also recorded in Table II.

EXAMPLE 33—PROCESS A

A mixture of 3.3 parts of dimethylformamide, 60 parts of xylene and 60 parts of methyl isobutyl ketone (MIBK) was heated and stirred under reflux in a glass reaction vessel in which a nitrogen atmosphere was maintained. A "solution K" was prepared by dissolving 16 parts of maleic anhydride and 1 part of benzoyl peroxide in 60 parts of methyl isobutyl ketone (MIBK), 2 parts of tertiary-butyl hydroperoxide and 0.8 part of n-octyl mercaptan. A "solution L" consisted of 67 parts of styrene, 0.8 part of n-octyl mercaptan and 14 parts of xylene. Solutions "K" and "L" were added simultaneously over a period of 2.5 hours and at uniform rates to the solvent mixture heated under reflux. When these additions were complete, 0.8 part of tertiary-butyl hydroperoxide and 0.4 part of benzoyl peroxide were added to the reaction vessel and heating and stirring under reflux were continued for a further 5 hours. A determination of the solids content of the reaction mixture then showed that the polymerisation was virtually complete. 1.51 parts of isooctanol (equivalent to 1 mole of the alcohol per mole of anhydride in the polymer) were added to 20 parts of the polymer solution which contained 5.9 parts of polymer, and the mixture was heated at 100° C. for 12 hours. 1.1 parts of "Epon 828" (calculated on the basis of 2 parts of the epoxy resin per 1 part of maleic anhydride in the copolymer) were added to the cooled resin solution; a film of the latter was cast on a flat sheet of glass; the wet film thickness was approximately 0.008 inch. Solvent was allowed to evaporate for 30 minutes from the wet film at ambient conditions, when the glass plate was placed in an air-circulating oven at 150° C. for 0.5 hour.

The cured film was clear, transparent, highly glossy and hard and given a rating of 3 in the xylene-rub test, as recorded in Table II.

OTHER EXAMPLES ACCORDING TO PROCESS A

Where "isooctyl hydrogen maleate" is indicated for "Process A" in Table II, as, e.g., in Example 35, the maleic anhydride was replaced with the acid maleate ester. Where the co-mer I is described as "isooctyl hydrogen maleate formed in situ," the required amount of isooctanol was added to the solvent mixture charged initially into the glass reaction vessel, and the experiment was otherwise carried out as in Example 33, using solutions "K" and "L."

Whenever the ratio styrene/co-mer I was 4:1, the molar quantities were 0.64 mole of styrene and 0.16 mole of co-mer I. Where the molar ratio was 5:1, the total quantity of co-mer I plus styrene was kept the same as in Example 33, i.e., 0.80 mole. The weight ratio of solvent (exclusive of the dipolar aprotic solvent) to total monomers was as in Example 33, whenever co-mer I was maleic anhydride, and as in Example 35, whenever co-mer I was isooctyl hydrogen maleate. The adjustments in quantities of solvents used to maintain these ratios were made in the initial charge of solvent to the reactor.

In some experiments as indicated in Table II, e.g., in Examples 41 and 47, the glass reactor was heated in an oil bath maintained at 80° C. and not heated under reflux. Where the temperature of polymerisation is given as 80° C., or where benzene-methyl isobutyl ketone mixtures were used as the reaction medium, the peroxide catalysts described for Example 33 were replaced by 3 parts of azobisisobutyronitrile. Where the duration of the polymerisation was greater than 10 hours, further additions of 1 part of catalyst were made at 12 hourly intervals.

EXAMPLE 36—PROCESS B

A solution of 9.8 g. of maleic anhydride, 0.8 g. of azobisisobutyronitrile and 0.5 part of tertiary dodecyl mercaptan in 120 parts of dimethylformamide and 41.6 parts of styrene in a glass flask was kept in an oil bath at 100° C. for 40 hours. Portions of 0.3 g. of the initiator were added after 3 and 20 hours from the start of the reaction. The solids content of the solution at 40 hours showed that the polymerisation was complete. The solution was poured slowly and with vigorous stirring into 1.5 litres of cold methanol. The precipitated polymer was collected by filtration, washed with cold methanol and dried in vacuo at 80° C.

A sample of the polymer was dissolved in benzene-methyl isobutyl ketone (1:2 w./w.) mixed with "Epon 828" as in Example 33. A film of the mixture was cast on glass and cured in an oven at 150° C. as in Example 33. The film was transparent, hard and glossy, and barely affected when rubbed with xylene in the test described above. The film was given a rating "3–4" (see below) as set out in Table II.

Example 37 was carried out by the process of Example 36 except that at 80° C. 52 g. of styrene and 4.9 g. of maleic anhydride were used and additions of 0.4 part of initiator were made at 5, 35 and 54 hours respectively.

TABLE I

| Example Number | Co-mer I | Wt., g. | Co-mer II | Wt., g. | Co-mer II/Co-mer I, mole ratio | Dipolar aprotic solvent | Wt., g. | Reaction medium, g. | Conversion, percent | Mole percent Co-mer I in copolymer |
|---|---|---|---|---|---|---|---|---|---|---|
| 14 | n-Butyl acid maleate | 2.085 | Styrene | 5.2 | 4.125 | Dimethylformamide | 10.2 | b 6.8 | c 22 | 17 |
| 15 | do | 2.085 | do | 5.2 | 4.125 | Control | | a 17.0 | c 34 | 35 |
| 16 | do | 2.085 | do | 5.2 | 4.125 | N,N-dimethyl propionamide | 10.2 | b 6.8 | c 11 | 17 |
| 17 | do | 2.085 | do | 5.2 | 4.125 | N,N-dimethyl acetamide | 10.2 | b 6.8 | c 12 | 17 |
| 18 | do | 2.085 | do | 5.2 | 4.125 | N,N-dimethyl stearamide | 10.2 | b 6.8 | c 36 | 19 |
| 19 | do | 2.085 | do | 5.2 | 4.125 | Diethylformamide | 10.2 | b 6.8 | c 15 | 25 |
| 20 | do | 2.085 | do | 5.2 | 4.125 | Dimethylformamide | 10.2 | b 6.8 | c 22 | 16 |
| 21 | do | 2.085 | do | 5.2 | 4.125 | N-methylpyrrolidone | 10.2 | b 6.8 | c 18 | 13 |
| 22 | do | 2.085 | do | 5.2 | 4.125 | Tetramethyl urea | 10.2 | b 6.8 | d 4 | 18 |
| 23 | do | 2.085 | do | 5.2 | 4.125 | Dimethyl sulphoxide | 10.2 | a 17 | c 13 | 41 |
| 24 | do | 2.085 | do | 5.2 | 4.125 | Control | | b 6.8 | c 19 | 38 |
| 25 | Maleic acid | 1.45 | do | 5.2 | 4 | Dimethylformamide | 10.2 | a 15.6 | c 38 | 15 |
| 26 | do | 1.45 | do | 5.2 | 4 | Control | 9.3 | b 6.3 | c 12 | 37 |
| 27 | n-Butyl acid fumarate | 2.085 | do | 5.2 | 4.125 | Control | | a 15.8 | c 11 | 21 |
| 28 | do | 2.085 | do | 5.2 | 4.125 | Dimethylformamide | 9.4 | b 6.2 | c 11 | 41 |
| 29 | Maleic anhydride | 1.225 | Ethyl acrylate | 5.2 | 4 | Control | | a 15.0 | c 28 | 15 |
| 30 | do | 1.225 | do | 5.0 | 4 | Dimethylformamide | 9.0 | b 6.0 | c 42 | 15 | a = Methyl ethyl ketone.
b = Acetone.
c = After one hour at reaction temperature.
d = After 0.25 hour at reaction temperature.
e = After 1.2 hours at reaction temperature.
f = Yield of copolymer, g. / Total weight of monomers, g. × 100

TABLE II

| Ex. No. | Co-mer I | Styrene/Co-mer I, mole ratio | Dipolar aprotic solvent Type | Conc., mole percent on total monomers | Reaction medium (solvents other than dipolar aprotic) | Process | Temp. of polymerisation | Time, hrs. | Conversion, percent[1] | Rating of cured film |
|---|---|---|---|---|---|---|---|---|---|---|
| 33 | Maleic anhydride | 4:1 | Dimethylformamide | 5.6 | Xylene/MIBK 1:2 | A | Reflux | 7 | 100 | 3 |
| 34 | do | 4:1 | do | 10 | do | A | do | 10 | 100 | 4 |
| 35 | Isooctyl hydrogen maleate | 4:1 | do | 8.8 | Benzene/MIBK 1:1 | A | do | 58 | 100 | 3 |
| 36 | Maleic anhydride | 4:1 | do | | None | B | 100 | 40 | 100 | 3 |
| 37 | do | 10:1 | Dimethylformamide sole solvent | | None | B | 80 | 102 | 95 | 3-4 |
| 38 | do | 4:1 | N-methyl N-ethyl acetamide | 20.4 | Benzene/MIBK 1:1 | A | Reflux | 23 | 96 | 3-4 |
| 39 | do | 4:1 | t-Butyl formamide | 18.8 | Xylene/MIBK 1:2 | A | do | 7 | 100 | 3-4 |
| 40 | do | 4:1 | N,N,N',N'-tetramethyl adipamide | 5.0 | Benzene/MIBK 1:2 | A | do | 40 | 100 | 3 |
| 41 | do | 4:1 | Dimethyl sulphoxide | 26.0 | Benzene/MIBK 8:2 | A | do | 11 | 96 | 3 |
| 42 | do | 4:1 | do | 80.1 | Xylene/MIBK 1:2 | A | 80 | 7 | 100 | 3 |
| 43 | do | 4:1 | Pyridine N-oxide | 1.0 | Benzene/MIBK 1:1 | A | Reflux | 24 | 95 | 3 |
| 44 | do | 4:1 | do | 5.5 | Xylene/MIBK 1:2 | A | do | 7 | 95 | 3 |
| 45 | Isooctyl hydrogen fumarate | 4:1 | N-formyl morpholine | 6.9 | Dioxan/benzene/MIBK 5:4:3 | C | do | 40 | 93 | 3-4 |
| 46 | do | 4:1 | N-formyl pyrrolidine | 4.0 | Benzene/MIBK 1:2 | A | 80 | 54 | 96 | 3 |
| 47 | Isooctyl hydrogen maleate, formed in situ | 4:1 | N-formyl piperidine | 5.1 | do | A | do | 59 | 92 | 3 |
| 48 | | 4:1 | | 4.5 | do | A | do | 54 | 90 | 3 |
| 49 | Maleic anhydride | 4:1 | N-acetyl morpholine | 18.1 | Benzene/MIBK 1:1 | A | Reflux | 16 | 95 | 3-4 |
| 50 | do | 4:1 | N-acetyl piperidine | 12.0 | do | A | do | 20 | 100 | 2 |
| 51 | do | 4:1 | Hexamethylphosphoramide | 12.3 | do | A | do | 20 | 95 | 2 |
| 52 | do | 4:1 | do | 17.5 | Xylene/MIBK 1:1 | A | do | 7 | 100 | 4 |
| 53 | do | 4:1 | do | 10.8 | Xylene/MIBK 1:2 | A | do | 7 | 100 | 4 |
| 54 | do | 4:1 | do | 4.0 | Benzene/MIBK 2:3 | A | do | 7 | 100 | 4 |
| 55 | do | 4:1 | do | 2.0 | Benzene/MIBK 1:1 | A | do | 23 | 85 | 4 |
| 56 | do | 4:1 | do | 2.8 | Xylene/MIBK 1:2 | A | do | 7 | 100 | 4 |
| 57 | do | 4:1 | [N,N-dimethyl O,O'-diethyl phosphoramidate] | 1.4 | do | A | do | 7 | 100 | 4 |
| 58 | do | 4:1 | Tetramethyl chloromethylphosphonamide | 8.8 | Xylene/MIBK 2:3 | A | do | 7 | 100 | 4 |
| 59 | do | 4:1 | Tetramethyl phenylphosphonamide | 2.5 | Xylene/MIBK 1:2 | A | do | 7 | 100 | 2 |
| 60 | do | 4:1 | N-methyl caprolactam | 8.3 | do | A | do | 7 | 100 | 3 |
| 61 | do | 4:1 | do | 8.3 | Benzene/MIBK 1:2 | A | do | 30 | 100 | 3 |
| 62 | do | 4:1 | N-methyl piperidone | 18.3 | Benzene/MIBK 1:1 | A | do | 15 | 94 | 2 |
| 63 | do | 4:1 | N,N-dimethyl ethyl carbamate | 42.8 | Benzene/MIBK 1:2 | A | 80 | 7 | 87 | 3 |
| 64 | | 4:1 | | | Xylene/MIBK 1:2 | C | Reflux | 7 | 100 | 0 |
| 65 | Isooctyl hydrogen fumarate | 4:1 | | | Benzene/MIBK 5:4:3 | A | 80 | 63 | 93 | 0 |
| 66 | Isooctyl hydrogen maleate | 4:1 | | | Benzene/MIBK 1:1 | A | Reflux | 60 | 100 | 0 |
| 67 | Isooctyl hydrogen maleate, formed in situ | 4:1 | | | Benzene/MIBK 1:2 | A | do | 50 | 100 | 0 |

[1] Conversion = $\frac{\text{Total weight of copolymer formed}}{\text{Total weight of monomers}} \times 100$.

EXAMPLE 45—PROCESS C

A solution of 5.2 parts of pyridine N-oxide in a mixture of 60 parts of benzene and 60 parts of methyl isobutyl ketone was heated and stirred under reflux. A solution of 37.2 parts of isooctyl hydrogen fumarate and 3 parts of azobisisobutyronitrile in 100 parts of dioxan was added at a uniform rate over 2.5 hours to the refluxing solution. Simultaneously, a mixture of 67 parts of styrene and 20 parts of benzene was added at a uniform rate to the refluxing solution. Additions of 0.5 part of azobisisobutyronitrile were made at 13, 22 and 34 hours from the start of the polymerisation. After a reaction time of 40 hours a copolymer conversion of 93% was obtained. The copolymeric product was converted to a cross-linked film as described in Example 33 and the film was found to be clear, transparent, hard, highly glossy and resistant to xylene.

CONTROL EXPERIMENTS 64 TO 67 INCLUSIVE

Experiments 64, 65, 66 and 67 were control experiments according to the prior art carried out in the manner of processes A and C as indicated in Table II except that the dipolar aprotic solvent was omitted. In all control experiments the cured film produced from the cross-linked copolymer was soft, hazy and dissolved completely in less than 2 minutes during the xylene rub test, as indicated in the last column by the rating "0." This behaviour is typical of the presence of substantial amounts of uncross-linked homopolymer of co-mer II.

We claim:
1. A process for the manufacture of copolymers which comprises copolymerizing at least one derivative I of a member of the group consisting of a monoethylenically unsaturated dicarboxylic acid, an anhydride, an acid ester and an acid amide of a monoethylenically unsaturated dicarboxylic acid excluding, however, fumaric acid itself with one or more ethylenically unsaturated co-mers II having one of the formulae

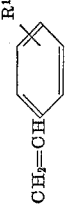

$CH_2=CHCOOR^2$ and $CH_2=CH \cdot CONR^3R^4$, wherein $R^1$ is a member of the group consisting of halogen and alkyl having 1 to 4 carbon atoms, $R^2$ is a member of the group consisting of alkyl and alkyl substituted by a member of the class consisting of alkoxy and poly(alkeneoxy) terminated by a hydrocarbyl group, and $R^3$ and $R^4$ are each selected from the group consisting of alkyl and hydrogen, said derivative having a strong tendency to yield an alternating copolymer with co-mer II, and forming a substantially homogeneous copolymer comprising at least 2 moles of said ethylenically unsaturated co-mer II per mole of said monoethylenically unsaturated dicarboxylic derivative I, the polymerization being carried out in solution in the presence of an inert dipolar aprotic solvent having a dipole moment greater than 3.3 and a dielectric constant greater than 23 and selected from the group consisting of:

(A) a carboxylic acid amide of the formula $$R^5 \overset{O}{\underset{\|}{C}} -NR^6R^7$$

wherein $R^5$ is hydrogen, alkyl, aryl, cycloalkyl, alkaryl, aralkyl, —$R^{10}$—$COOR^8$ or $R^{10}$—$CONR^8R^9$; $R^6$, $R^7$, $R^8$ and $R^9$ which may be the same or different are alkyl, cycloalkyl, aryl, alkaryl or aralkyl and $R^6$ and $R^9$ may also be hydrogen, —$R^{10}$— is a bivalent radical arylene, alkylene, aralkylene or —$(CH_2)_m$—$O(CH_2)_p$— where $m$ and $p$ are integers, (B) a cyclic lactam of the formula $$R^7-N\underset{CO}{\overset{(CH_2)_q}{\diagup\diagdown}}$$

where $R^7$ is as above defined and $q$ is an integer from 3 to 7 inclusive, (C) a stable acylated cyclic secondary amine of the formula $$R^6.\overset{O}{\underset{\|}{C}}.N\underset{R^{12}}{\overset{R^{11}}{\diagup\diagdown}}X_t$$

wherein $R^{11}$ and $R^{12}$ are alkylene bridges, X, which may be absent ($t=0$) or present ($t=1$), stands for —O— or $$\diagdown N\overset{O}{\underset{\|}{C}}R^9 \diagup$$

$R^6$ and $R^9$ are as defined above and wherein the ring may be 5, 6 or 7 membered, (D) a substituted phosphoramide of the formula $$\left(\underset{R^7}{\overset{R^6}{\diagdown}}N\diagup\right)_a -\overset{O}{\underset{\|}{P}}\underset{(OR^{13})_c}{\overset{(OR^8)_b}{\diagup}}$$

where $R^6$, $R^7$ and $R^8$ are as above defined and $R^{13}$ is defined as $R^8$ and, optionally, may be substituted with halogen or alkoxy groups and $a$ may be 1, 2 or 3; $b$ and $c$, which may be the same or different, stand for 2, 1 or 0 and $a+b+c=3$, (E) a substituted phosphonamide of the formula $$\left(\underset{R^7}{\overset{R^6}{\diagdown}}N\diagup\right)_d -\overset{O}{\underset{\|}{P}}\underset{R^{13}}{\overset{(OR^8)_e}{\diagup}}$$

where $R^6$, $R^7$ and $R^8$ are as above defined and $R^{13}$ is defined as $R^8$ and, optionally, may be substituted with halogen or alkoxy groups and $d$ may stand for 1 or 2 and $e=1$ or 0 and $d+e=2$, (F) a carbonic acid amide of the formula $$R^6R^7N—CO—Y$$

where Y stands for $OR^8$ or $NR^8R^9$, and $R^6$, $R^7$, $R^8$ and $R^9$ are as above defined, (G) a sulphoxide of the formula $R^{14}R^{15}SO$ where $R^{14}$ and $R^{15}$ which may be the same or different are alkyl groups having 1 to 4 carbon atoms, and (H) an N-oxide of an aromatic cyclic tertiary amine.

2. A process according to claim 1 wherein derivative I is maleic acid, the anhydride of maleic, chloromaleic or citraconic acid or the acid ester of maleic, fumaric, chloromaleic or citraconic acid.

3. A process according to claim 1 wherein derivative II is styrene, m-vinyl toluene or p-vinyl toluene.

4. A process according to claim 1 wherein derivative I is maleic anhydride or an acid ester of maleic or fumaric acid and co-mer II is styrene.

5. A process according to claim 1 wherein the dipolar aprotic solvent is a carboxylic acid amide of the formula $$R^5 \overset{O}{\underset{\|}{C}} -NR^6R^7$$

wherein $R^5$ is hydrogen, alkyl, aryl, cycloalkyl, alkaryl, aralkyl, —$R^{10}$—$COOR^8$ or $R^{10}$—$CONR^8R^9$; $R^6$, $R^7$, $R^8$ and $R^9$ which may be the same or different are alkyl, cycloalkyl, aryl, alkaryl or aralkyl and $R^6$ and $R^9$ may also be hydrogen, —$R^{10}$— is a bivalent radical arylene, alkylene, aralkylene or —$(CH_2)_m$—$O(CH_2)_p$— where $m$ and $p$ are integers.

6. A process according to claim 1 wherein the dipolar aprotic solvent is a cyclic lactam of the formula $$R^7-N\underset{CO}{\overset{(CH_2)_q}{\diagup\diagdown}}$$

where $R^7$ is as above defined and $q$ is an integer from 3 to 7 inclusive.

7. A process according to claim 1 wherein the dipolar aprotic solvent is a stable acylated cyclic secondary amine of the formula $$R^6.\overset{O}{\underset{\|}{C}}.N\underset{R^{12}}{\overset{R^{11}}{\diagup\diagdown}}X_t$$

wherein $R^{11}$ and $R^{12}$ are alkylene bridges, X, which may be absent ($t=0$) or present ($t=1$), stands for —O— or $$\diagdown N\overset{O}{\underset{\|}{C}}R^9 \diagup$$

$R^6$ and $R^9$ are as defined above and wherein the ring may be 5, 6 or 7 membered.

8. A process according to claim 1 wherein the dipolar aprotic solvent is a substituted phosphoramide of the formula $$\left(\underset{R^7}{\overset{R^6}{\diagdown}}N\diagup\right)_a -\overset{O}{\underset{\|}{P}}\underset{(OR^{13})_c}{\overset{(OR^8)_b}{\diagup}}$$

where $R^6$, $R^7$ and $R^8$ are as above defined and $R^{13}$ is defined as $R^8$ and, optionally, may be substituted with halogen or alkoxy groups and $a$ may be 1, 2, or 3; $b$ and $c$, which may be the same or different, stand for 2, 1 or 0 and $a+b+c=3$.

9. A process according to claim 1 wherein the dipolar aprotic solvent is a substituted phosphonamide of the formula $$\left(\underset{R^7}{\overset{R^6}{\diagdown}}N\diagup\right)_d -\overset{O}{\underset{\|}{P}}\underset{R^{13}}{\overset{(OR^8)_e}{\diagup}}$$

where $R^6$, $R^7$ and $R^8$ are as above defined and $R^{13}$ is defined as $R^8$ and, optionally, may be substituted with halogen or alkoxy groups and $d$ may stand for 1 or 2 and $e=1$ or 0 and $d+e=2$.

10. A process according to claim 1 wherein the dipolar aprotic solvent is carbonic acid amide of the formula $R^6R^7N$—CO—Y where Y stands for $OR^8$ or $NR^8R^9$, and $R^6$, $R^7$, $R^8$ and $R^9$ are as above defined.

11. A process according to claim 1 wherein the dipolar aprotic solvent is a sulphoxide of the formula $R^{14}R^{15}SO$ where $R^{14}$ and $R^{15}$ which may be the same or different are alkyl groups having 1 to 4 carbon atoms.

12. A process according to claim 1 wherein the dipolar aprotic solvent is an N-oxide of an aromatic cyclic tertiary amine.

13. A process according to claim 1 wherein the dipolar aprotic solvent is a compound of the formula

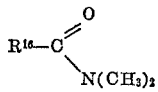

where $R^{16}$ is hydrogen or methyl.

14. A process according to claim 1 wherein the dipolar aprotic solvent is hexamethylphosphoramide.

15. A process according to claim 1 wherein the dipolar solvent is tetramethyl urea.

16. A process according to claim 1 wherein the dipolar aprotic solvent is pyridine N-oxide.

17. A process according to claim 1 wherein the dipolar aprotic solvent is N-methylpyrollidone.

18. A process according to claim 1 wherein the dipolar aprotic solvent is N,N-dimethylpropionamide, N,N-dimethylstearamide, N,N-dimethylbenzamide, N,N,N',N'-tetramethyladipamide, N-methylpiperidone, N - methyl-epsiloncaprolactam, N-formyl-pyrollidine, N-acetyl-pyrollidine, N-formyl piperidine, N-acetyl piperidine, N-formyl morpholine, N-acetyl morpholine, tetramethyl chloromethylphosphonamide, tetramethyl phenylphosphonamide, N,N-dimethyl ethyl carbamate or dimethyl sulfoxide.

19. A solution copolymerisation process according to claim 1 wherein the lower limit of concentration of dipolar aprotic solvent in the reaction mixture is between 0.5 mole percent of the total monomers present and the upper limit is the case where the polar aprotic solvent is the reaction medium.

20. A process for the manufacture of copolymers which comprises copolymerizing at least one derivative I of a member of the group consisting of a monoethylenically unsaturated dicarboxylic acid, an anhydride, an acid ester and an acid amide of a monoethylenically unsaturated dicarboxylic acid excluding, however, fumaric acid itself with one or more ethylenically unsaturated co-mers II having one of the formulae

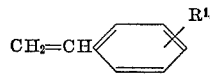

$CH_2=CHCOOR^2$ and $CH_2=CH \cdot CONR^3R^4$, wherein $R^1$ is a member of the group consisting of halogen and alkyl having 1 to 4 carbon atoms, $R^2$ is a member of the group consisting of alkyl and alkyl substituted by a member of the class consisting of alkoxy and poly(alkeneoxy) terminated by a hydrocarbyl group, and $R^3$ and $R^4$ are each selected from the group consisting of alkyl and hydrogen, said derivative having a strong tendency to yield an alternating copolymer with co-mer II, and forming a substantially homogeneous copolymer comprising at least 2 moles of said ethylenically unsaturated co-mer II per mole of said monoethylenically unsaturated dicarboxylic derivative I, the polymerization being carried out in solution in the presence of an inert solvent selected from the group consisting of dimethylformamide, diethylformamide, N,N-dimethyl acetamide, N,N-dimethyl propionamide, N,N-dimethyl stearamide, N-methyl N-ethyl acetamide, t-butyl formamide, N,N-dimethyl benzamide, N,N,N',N'-tetramethyl adipamide, N-methyl pyrollidone, N-methyl piperidone, N-methyl-epsilon-caprolactam, N-formyl morpholine, N-acetyl morpholine, N-formyl pyrollidine, N-acetyl pyrollidine, N-formyl piperidine, N-acetyl piperidine, hexamethylphosphoramide, N,N-dimethyl O,O'-diethylphosphoramidate, tetramethyl phenyl phosphonamide, N, N, N', N' - tetramethylchloromethyl phosphonamide, tetramethyl urea, N,N-dimethyl ethyl carbamate, dimethyl sulphoxide and pyridine-N-oxide.

References Cited

UNITED STATES PATENTS

| 3,297,657 | 1/1967 | Gray et al. | 260—78.5 |
| 3,336,267 | 8/1967 | Zimmerman et al | 260—78.5 |
| 3,345,332 | 10/1967 | Hoyt et al. | 260—80 XR |
| 3,388,106 | 6/1968 | Muskat | 260—78.5 |

JOSEPH L. SCHOFER, Primary Examiner

JOHN KIGHT III, Assistant Examiner

U.S. Cl. X.R.

260—30.2, 30.6, 30.8, 32.4, 32.6, 78